United States Patent
Tessmann et al.

[11] 3,890,189
[45] June 17, 1975

[54] APPARATUS FOR WELDING SYNTHETIC YARNS

[75] Inventors: Erich Tessmann; Hans-Erich Tessman, both of Wuppertal, Germany

[73] Assignee: Heberlein & Co. AG., Wattwil, Switzerland

[22] Filed: Sept. 14, 1973

[21] Appl. No.: 397,301

[30] Foreign Application Priority Data
Sept. 14, 1972   Germany............................ 2245122

[52] U.S. Cl................ 156/433; 156/158; 156/296; 156/499; 156/502; 156/579
[51] Int. Cl........................ B65h 69/06; B65h 69/08
[58] Field of Search ........... 156/157, 158, 159, 180, 156/433, 441, 449, 502, 579, 296

[56] References Cited
UNITED STATES PATENTS

| | | |
|---|---|---|
| 3,160,547 | 12/1964 | Williams............................ 156/433 |
| 3,301,735 | 1/1967 | Williams............................ 156/433 |
| 3,323,971 | 6/1967 | Williams............................ 156/433 |
| 3,492,181 | 1/1970 | Riseley.............................. 156/433 |
| 3,607,599 | 9/1971 | Williams............................ 156/433 |
| 3,690,994 | 9/1972 | Williams............................ 156/433 |
| 3,827,929 | 8/1974 | Bledsoe et al. .................... 156/158 |

*Primary Examiner*—Daniel J. Fritsch
*Attorney, Agent, or Firm*—Fitzpatrick, Cella, Harper & Scinto

[57] ABSTRACT

Apparatus for welding synthetic yarns include yarn gripping means mounted on levers which are pivotable towards yarn welding means, the levers being biased so as to be separated from each other when in inactive position to allow for yarn insertion, and actuating means operable first to press the levers together and then to move both towards the welding means.

6 Claims, 4 Drawing Figures

APPARATUS FOR WELDING SYNTHETIC YARNS

The present invention relates to apparatus for welding synthetic yarns, and more particularly to such apparatus wherein a gripper is movable by an actuating mechanism for seizing and fixing parallel yarn ends, and a heating element for melting the yarn ends and for simultaneously welding together the front faces obtained by melting of the yarn ends.

Various types of apparatus of the class described are already known. Thus for example, in German Auslegeschrift 1,535,921, an apparatus is shown in which the yarn ends to be connected are passed through a groove, and cut off and welded by means of a sealing iron. This known apparatus however has not made its proofs in practice because of its high weight which calls for stationary arrangement only and excludes its use as a portable tool. Furthermore, the cost of this apparatus is high as is the cost of maintenance of same. Additionally, it is known from German Offenlegungsschrift 1,710,460 to tighten synthetic yarns in a relatively complicated clamp device which also requires apparatus of large dimension and stationary arrangement to melt off the yarn ends by means of a swivellable heating element and to weld them together.

Furthermore, various types of portable yarn welding devices have become known which, however, as a whole, are subject to disadvantages such as high capital and production costs as well as numerous individual parts constructively necessary for a complete assembly. Thus, we have conceived apparatus of the class described by which we are able to avoid the disadvantages of the known devices and particularly to provide a relatively inexpensive yarn welding device which, while being constructed in a simple manner, may be portable and assures safe welding of synthetic yarns.

According to the present invention, this is primarily achieved by the combination of the following features:

- Counterholder and gripper element for fixing the parallel yarn ends are each arranged on a lever;
- both levers are pivotally supported on a common pivot;
- both levers are spring-biased so that, in inactive position, the counterholder and the gripper element are kept at a distance from each other for enabling insertion of the yarn ends between them;
- the gripper element and the counterholder comprise a flat portion for pinching the yarn ends; and
- an actuating device of the yarn welding apparatus comprises an arm which in operation at first presses the lever of the gripper element against the lever of the counterholder and then pivots both levers towards the heating element.

The apparatus according to the present invention is therefore composed only of three essential elements: two levers pivotable about a common axis in a most simple manner, and the heating element towards which the yarn ends are moved. Especially the flat form of the gripper element and of the counterholder makes it possible, according to the present invention, to do without further tightening devices of the type necessary in known construction.

A further essential simplification is obtainable, according to the present invention, if both levers take the form of blade springs as this assures implicitly the necessary biasing and the flat construction of gripper element and counterholder.

Furthermore, the pivot may be improved in an optimally simple manner if, using the flexibility of the blade springs, only a common tightening location is provided to serve as the pivot.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein.

Figure 1:
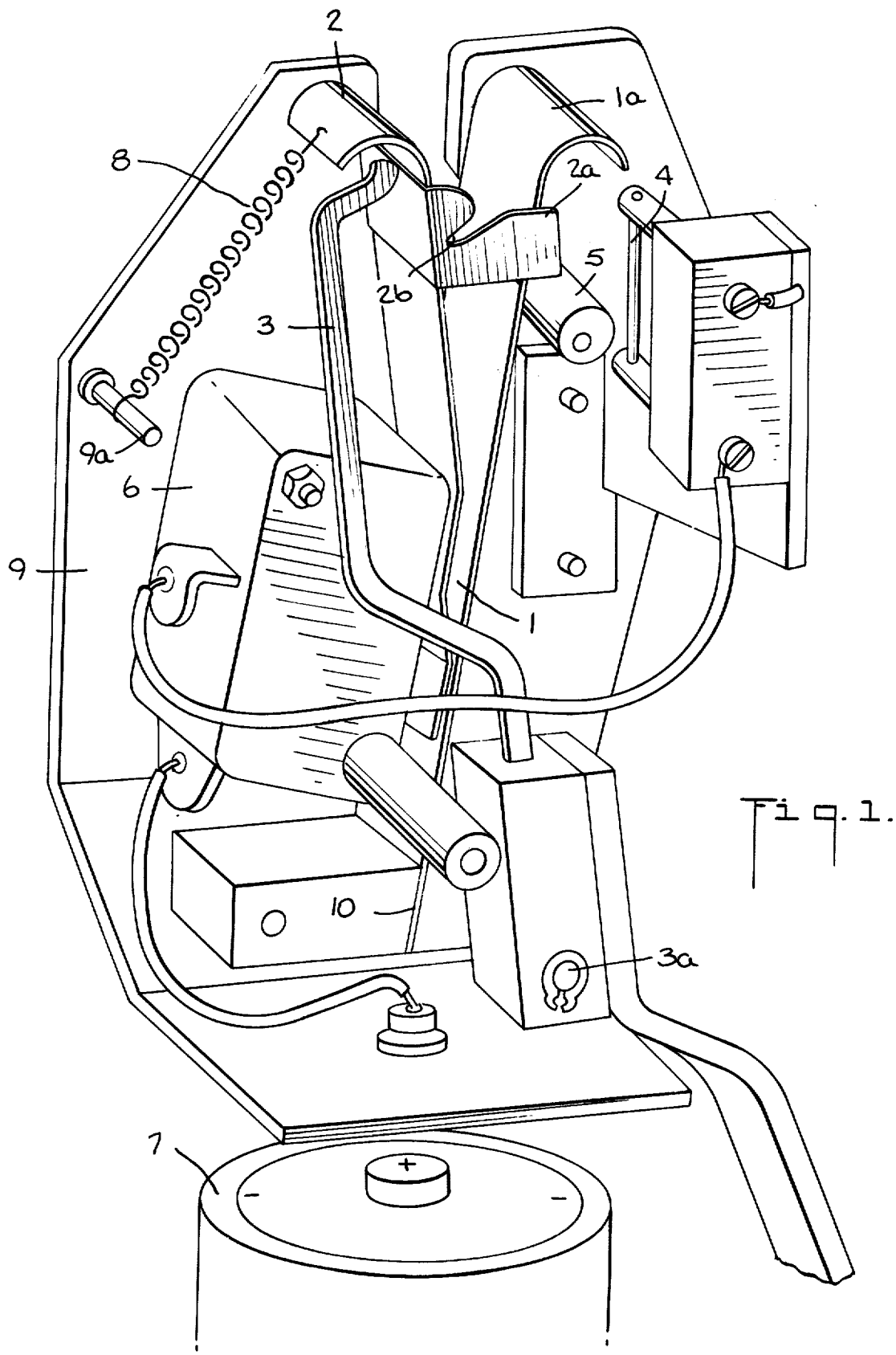
FIG. 1 is an elevational view, in perspective, illustrating a battery-operated portable yarn welding device which includes the features of the present invention.
Figure 2:
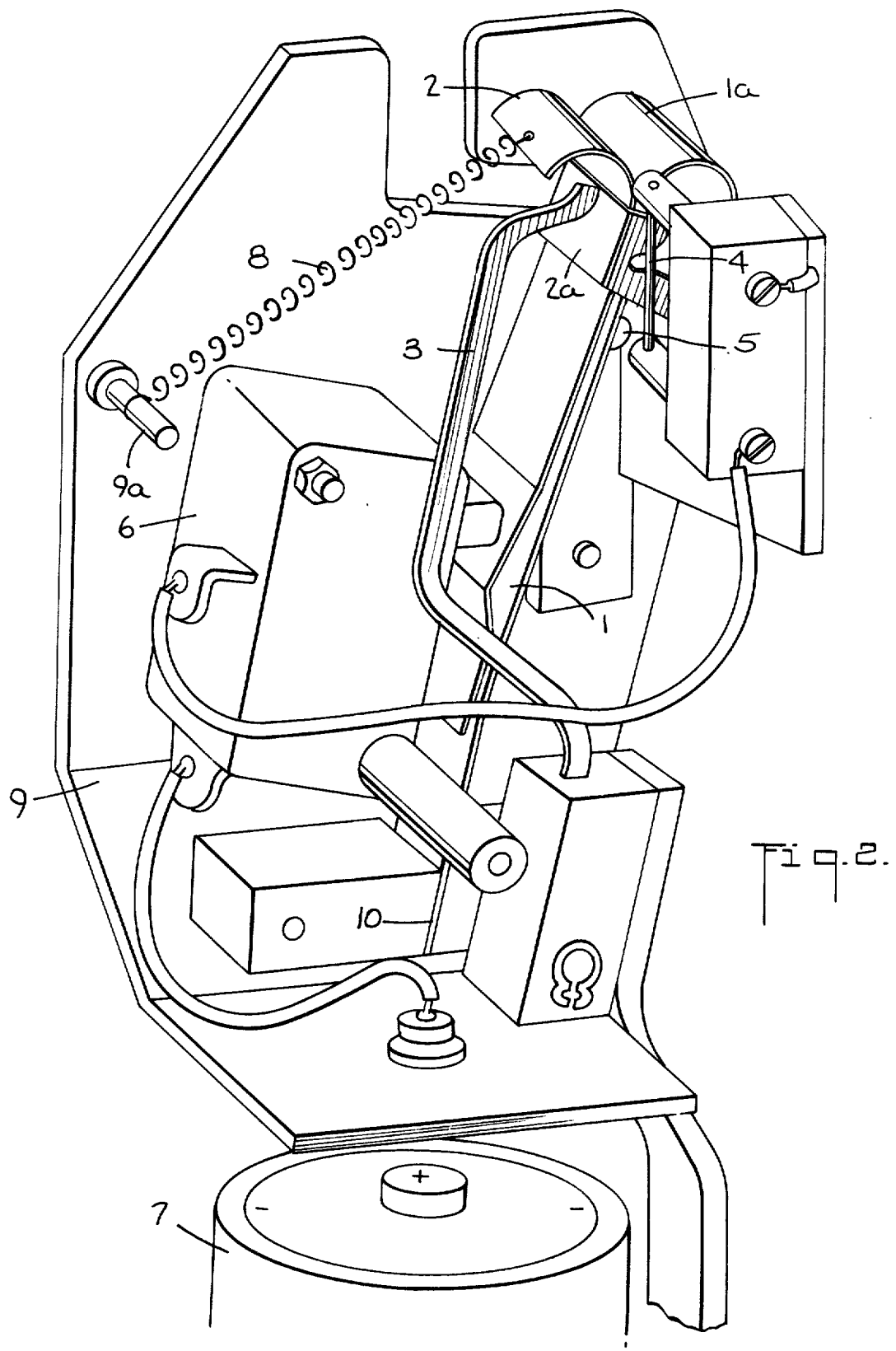
FIG. 2 illustrates the yarn welding device of FIG. 1 in active position.

Referring now to the drawings in detail, FIG. 1 shows a portable battery-operated yarn welding device in which two blade springs 1, 2 are mounted on a base plate 9 in a manner such that corresponding initial pivotal movement of an arm 3 about axis 3a at first effects closing of gripper element 2a, attached to spring 8, and the front part of blade spring 1 shaped as a counterholder 1a. In further progress of operation and upon further pivoting of arm 3, approach of the gripper element 2a towards heating element 4 is effected which at the same time is connected with battery 7 by means of switch 6 and thereby is heated to yarn welding temperature. A stop element 5 limits further pivoting movement of the blade springs 1, 2 around tightening location 10 as soon as the gripper element 2a lies immediately beside the heating element 4.

Figure 3:
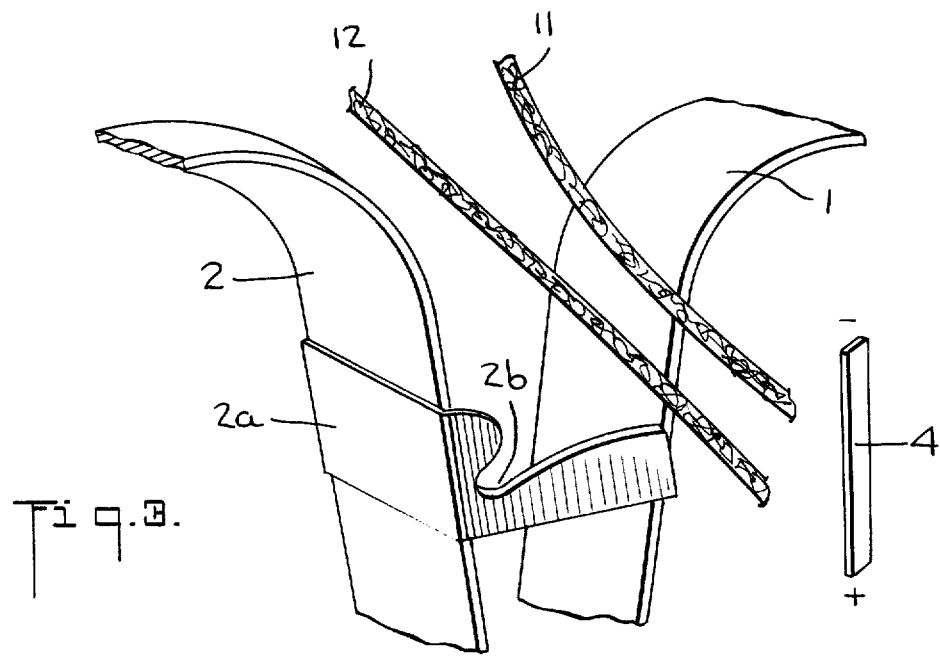
FIGS. 3 and 4 show the yarn gripping element and the counterholder of FIGS. 1 and 2 on an enlarged scale.
Figure 4:
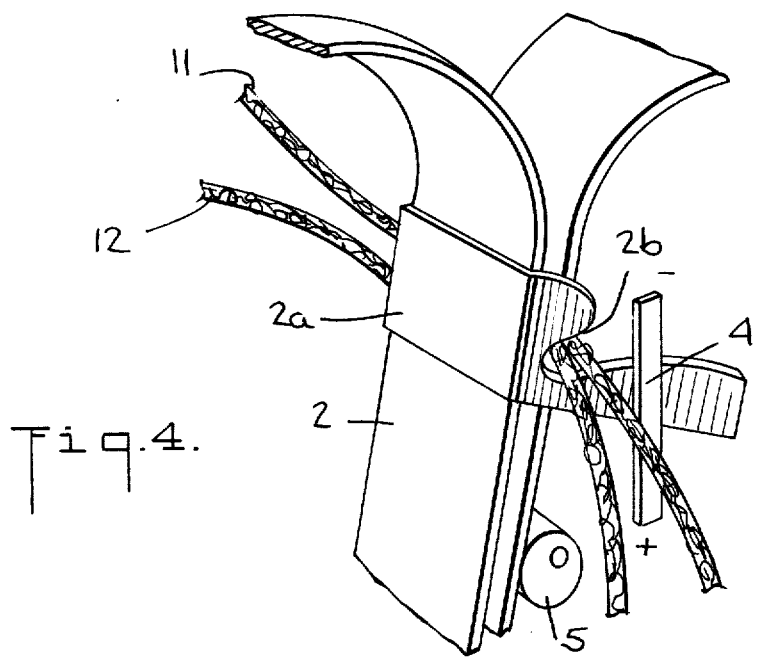

As can be seen in FIGS. 3 and 4, the yarn ends 11, 12 are melted off and welded while the same are safely fixed between the two blade springs 1, 2 and centered by gripper element 2a which is formed with a yarn receiving recess 2b for that purpose. As soon as melting together of the front faces is achieved, opening of the switch 6 can at first be effected by reduction of the pivot angle of arm 3 which is biased by return spring 8 connected between the upper end of spring 2 and a pin 9a studded in base plate 9. At this moment however, because of the bias-tension of blade spring 1, the yarn ends 11, 12 are still held fast so that the welding position is reliably fixed during cooling. After cooling, opening of the gripper element 2a and of counterholder 1a can be induced due to the force of return spring 8 whereupon the welded-together yarn ends can be removed from the device.

As can be seen, rotation of the stop element 5, which is eccentrically supported on base plate 9, permits adjustment of the distance from the heating element 4 of the blade springs 1, 2 and gripper 2a when in welding position so as to correspond to the characteristics of the material of the yarns to be welded together. Furthermore, it is rendered possible in an optimally simple manner to weld together yarns of various diameters with equal quality by using the blade springs 1, 2 of flat shape in the range of the gripper element 2a for holding the yarn reliably in cooperation with the gripper element 2a without any adjustment or modification thereof.

From the foregoing description it will be seen that we contribute by our invention apparatus for welding synthetic yarns by which we have overcome the noted difficulties and disadvantages of known apparatus intended for that purpose. It will also be seen that our apparatus is relatively inexpensive, safe, uncomplicated and portable.

We believe that the construction and operation of our novel apparatus will now be understood, and that the advantages thereof will be fully appreciated by those persons skilled in the art.

We claim:

1. Apparatus for welding synthetic yarns comprising a gripper element (2a) including means (2b) forming a yarn receiving recess, a counter-holder element (1a) for securing parallel yarn ends in said recess, and heating means for melting off the yarn ends while simultaneously welding the faces produced thereby, said counter-holder and gripper elements each being arranged on respective levers (1, 2), means mounting one of said levers for pivotal movement, means mounting the other of said levers for pivotal movement relative to said one of said levers, said elements each having a flat section for pinching the yarn ends therebetween, actuating means including an arm operable first to press one of said levers towards the other to bring said yarn receiving recess and said counter-holder element together and then to pivot both elements towards said heating means, and means biasing said elements away from said heating means and from each other.

2. Apparatus according to claim 1, characterized in that both levers are provided in the form of a blade spring (1, 2).

3. Apparatus according to claim 2, characterized in that both blade springs (1, 2) are arranged with a common tightening location (10) serving as a pivot.

4. Apparatus according to claim 3, characterized in that the blade spring (1) including the counterholder element (1a) is longer than the blade spring (2) carrying the gripping element (2a) and in that the said gripping element is fixed on said gripping element blade spring at the same distance from said tightening location (10) as the blade spring (1) of the counter-holder element (1a).

5. Apparatus according to claim 1 in which a stop element is provided for limiting the pivoting movement of said one of said elements towards welding position said stop element being a roller, means eccentrically mounting said roller to provide an axis about which said roller may be rotatably adjusted relative to said heating element.

6. Apparatus according to claim 1, characterized by a power source and switch means which are closed upon movement of said actuating means towards the yarn welding position to connect said power source to said heating means to bring same to yarn welding condition, whereby on reduction of pivot angle of the arm of said actuating means said switch means are opened thereby disconnecting said power source from said heating means while the lever of the gripper element and the lever of the counter-holder element are still pressed together thereby fixing the yarn ends in welding position during following cooling.

* * * * *